Jan. 7, 1936.  R. G. MINER  2,027,190

VALVE

Filed March 21, 1935

INVENTOR
Robert G Miner
BY
Arthur T Holmes
ATTORNEY

Patented Jan. 7, 1936

2,027,190

UNITED STATES PATENT OFFICE 2,027,190

VALVE

Robert G. Miner, La Crosse, Wis., assignor to The Trane Company, La Crosse, Wis.

Application March 21, 1935, Serial No. 12,232

8 Claims. (Cl. 251—139)

My invention relates to a packless valve.

One of the objects of my invention is the use of a diaphragm for the purpose of seating the valve and preventing the escape of steam or gas therefrom.

Another object of my invention is to transmit motion through the diaphragm and to multiply the motion thereof on the side of the diaphragm nearest the valve, thereby preventing abnormal distortion of the diaphragm.

The various features of novelty which characterize my invention are pointed out in claims annexed to and forming a part of this specification.

Figure 1:
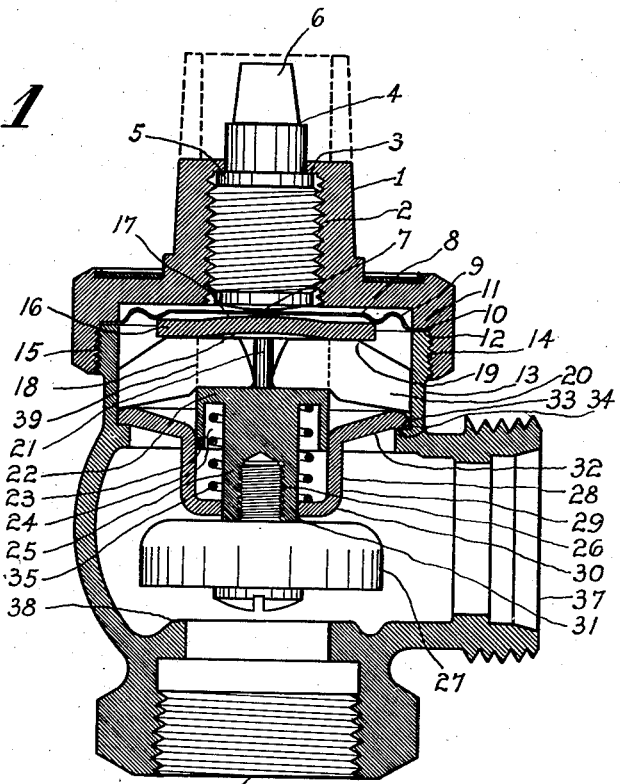

In the accompanying drawing which illustrates my invention, Figure 1 is a sectional elevation of the valve open.

Figure 2:
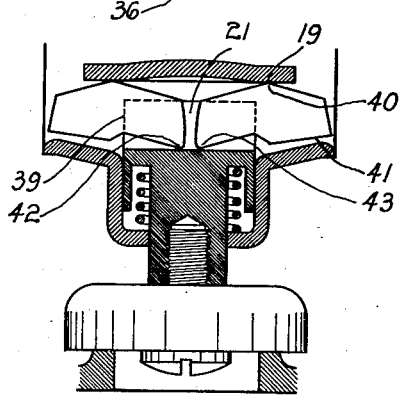

Figure 2 is a sectional elevation of the valve in a closed position.

In both views the dotted line 39 represents a portion of the valve stem cut away.

Referring to Figure 1, 1 is a bonnet interiorly threaded at 2 and with a shoulder 3 to stop the upward progress of the stem 4, which is exteriorly threaded to fit into the thread 2 and has a shoulder 5 adapted to strike against the shoulder 3. The top of the stem 4 has a beveled portion 6 adapted to fit a handle, not shown. The base of the stem 4 comprises an integral crowned disc 7 so adapted that upon a downward movement of the stem, the crowned disc 7 will press upon the corrugated flexible diaphragm 8, which has an annular corrugation 9. The edge 10 of the disc is adapted to fit between the annular shoulder 11 of the bonnet 1 and the upper annular face 12 of the valve body 13. The bonnet 1 is interiorly threaded at 14 and is mounted on the valve body by threading it on the exterior thread 15 of the valve body 13. The corrugated disc, when thus fixed between the valve body and the bonnet, seals the top of the valve and prevents the escape of steam or gas therefrom.

The fulcrum plate 16 is an annular disc slightly crowned at 17, with a lower concave portion 18 and with an annular flat surface 19 resting upon the upper faces of fulcrum levers 20 which lie without affixation in the radial slots 21 of the valve stem 22. A portion of the valve stem is cut away forming an annular channel section 24, one side of which is an integral annular flange 23 and the other side of said channel section is a cylindrical rod 25 interiorly threaded at the base at 26, by which is attached the valve head 27 which is threaded into the valve stem at 29. The guide 28 comprises the cylindrical wall 29, a flat base 30 with a round aperture 31 through which the rod 25 passes and is guided thereby. The upper end of the cylindrical wall is flared out in an integral upwardly flared flange 32, the peripheral edge 33 of which is supported on the annular shoulder 34 of the valve body.

The flange 32 is flared to allow movement of the fulcrum levers 20, as shown in Figure 2. A coiled spring 35 wound around the rod 25 has one end positioned against the guide 28 and its other end positioned against the bottom of the channel section 24. The guide is stationary and as the stem 22 moves down to close the valve, the spring 35 is compressed and will tend to open the valve when the downward pressure on the valve stem is released.

The valve body contains the ports 36 and 37 and the ordinary valve seat 38.

Figure 2 shows a section of the valve when it is closed and the spring compressed, and shows the action of the fulcrum levers 20 with a portion of the stem cut away on the dotted lines 39.

Each fulcrum lever has three points of contact, one 40, its top, where it contacts the lower surface of the fulcrum plate at 19, a second point of contact at 41, where it contacts the stationary upper face of the flange 32, a third point of contact at 42, where it contacts the movable valve stem 22 at the bottom of the slot 21 at the point shown in Figure 2 as at 43. It is seen that by movement of the lever at the point 40 the movement of the lever at the point 43 will be according to the law of levers.

Although the levers 20 are not positively anchored, it can be said that the point of pivot is at 41 and the free end at 42 and the force applied at 40.

In the operation of the valve the movement of the stem 2 imparts motion to the fulcrum plate through the corrugated diaphragm, and the motion imparted to the fulcrum plate is multiplied by the lever action described before and again imparted to the valve stem 22, which operates to force the valve head upon the seat. Upon the movement upward of the stem 2, the pressure upon the fulcrum plate is released and the valve then operates to open by means of the force exerted by the coil spring 35.

It will be further seen that the fulcrum levers 20 which lie without affixation in the radial slots 21 in the head of the valve stem 22 are maintained in their respective position between slots 21.

Although one specific embodiment of the invention has been particularly shown and described, it will be understood that the invention is capable of modification and that changes in the construction and in the arrangement of the various co-operating parts may be made without departing from the spirit or scope of the invention, as expressed in the following claims.

What I claim is:

1. In a valve, a body having ports, a valve seat, a valve member having a seat contacting portion at one end, valve actuating means extending exteriorly of the valve body and movable in the direction of movement of said valve member for applying force thereto and adjusting it relative to its seat, a lever within said valve body fulcrumed at one end thereon and bearing at its other end on said valve member, a flexible diaphragm positioned between said means and said lever, and means engaging the lever intermediate its ends to transmit the force so applied to the valve member and to multiply the motion thereof.

2. In a valve, a body having ports, a valve seat, a valve member having a seat contacting portion at one end, manual operating means having movement in the line of travel of said valve member for adjusting it relative to its seat, a flexible disc through which motion is transmitted from said operating means, a lever within said body fulcrumed at one end thereon and bearing at its other end on said valve member, said manual operating means applying force through said flexible disc to said lever intermediate its ends, thereby to multiply the motion of the valve member relative to the operating means.

3. In a valve, a body having ports, a valve seat, a valve member having a seat contacting portion at one end, valve actuating means movable in the direction of travel of said valve member to seat the same, a flexible disc through which motion is transmitted from said operating means, a spring in contact with said valve member for unseating it when said valve actuating means is withdrawn, a lever within said valve body fulcrumed at one end thereon and bearing at its other end on said valve member, said valve actuating means applying force through said flexible disc to said lever intermediate its ends, thereby to multiply the motion of the valve member relative to the operating means.

4. In a packless valve, a valve body with ports therein, a valve seat, a valve head closing said valve seat, a valve stem attached to said valve head, a flexible disc sealing the top of said valve body, means outside said body to impart motion to said disc, a fulcrum plate in contact with said disc, independent levers with their upper faces in contact with said fulcrum plate intermediate their ends, one end of each such independent levers being supported by the valve body and the other end of each in operative contact with said valve stem, whereby such motion is received by said fulcrum plate and retransmitted multiplied to said valve head by means of said independent levers.

5. In a packless valve, a valve body with ports therein, a valve seat, a valve head closing said valve seat, a valve stem attached to said valve head, a flexible disc sealing the top of said valve body, means outside said body to impart motion to said disc, a fulcrum plate in contact with said disc, slots in said valve stem, and levers in contact with said fulcrum plate intermediate their ends and with one end of each supported by the valve body and the other end bearing upon the bottom wall of said slots, whereby motion is received by said fulcrum plate and re-transmitted multiplied to said valve head by means of said levers.

6. In a packless valve, a valve body with ports therein, a valve seat, a valve head closing said valve seat, a valve stem attached to said valve head, a flexible disc sealing the top of said valve body, means outside said body to impart motion and pressure to said disc, a fulcrum plate in contact with said disc, slots in said valve stem, radially disposed levers in contact with the lower face of said fulcrum plate intermediate their ends and supported respectively at their ends by the valve body and in operative contact with the bottom wall of said slots, whereby motion is received by said fulcrum plate and re-transmitted multiplied to said valve head by means of said radially disposed levers.

7. In a packless valve, a valve body with ports therein, a valve seat, a valve head closing said valve seat, a valve stem attached to said valve head, a flexible disc sealing the top of said valve body, means outside said body for imparting motion and pressure to said disc, and means within said body to mulitply and impart such motion to said valve head, said last-named means comprising a fulcrum plate having a convex upper face, and unattached levers, the upper convex face of said fulcrum plate being in contact with said disc and the lower face thereof in contact with said unattached levers intermediate their ends, the respective ends of said unattached levers being in operative contact with said valve stem and fulcrumed upon a fixed support within said valve body.

8. In a packless valve, a valve body with ports therein, a valve seat, a valve head closing said valve seat, a valve stem attached to said valve head, a flexible disc sealing the top of said valve body, means outside said body for imparting motion and pressure to said disc, and means within said body to transmit and multiply the motion to said valve head, said last-named means comprising a fulcrum plate, and unattached levers, said fulcrum plate having a convex upper face and a lower face with a flat annular surface, the upper convex face of said fulcrum plate being in contact with said disc and said flat annular surface in contact with said unattached levers intermediate their ends, the ends of each unattached lever bearing respectively on a fixed support and on said valve stem.

ROBERT G. MINER.